3 Sheets—Sheet 1.

P. WALLACE.
MACHINE FOR MAKING MATCHES.

No. 169,867.  Patented Nov. 9, 1875.

WITNESSES.   INVENTOR.

Henry Beech,
Philip J. Edmund,

Peter Wallace

3 Sheets—Sheet 3.

P. WALLACE.
MACHINE FOR MAKING MATCHES.

No. 169,867. Patented Nov. 9, 1875.

WITNESSES.
Henry Beech
Philip J. Edmund,

INVENTOR.
Peter Wallace

UNITED STATES PATENT OFFICE.

PETER WALLACE, OF LONDON TOWNSHIP, MIDDLESEX COUNTY, CANADA.

IMPROVEMENT IN MACHINES FOR MAKING MATCHES.

Specification forming part of Letters Patent No. 169,867, dated November 9, 1875; application filed October 9, 1875.

*To all whom it may concern:*

Be it known that I, PETER WALLACE, of the township of London, in the county of Middlesex, in the Province of Ontario, Canada, have invented certain new and useful Improvements in Machines for Making Matches; and I do hereby declare that the following is a full, clear, and exact description of the same.

My invention relates, in the first place, to the manner of cutting blocks of timber into matches by means of an upright plane attached to a pitman, and connected with a revolving shaft and driving-wheel, in combination with a series of cutters, arranged as hereafter described.

My invention relates, in the second place, to the mode of racking the said matches, when so cut, by means of a frame supported on a carriage, to which a forward movement is communicated by a horizontal screw, operated by the upward and downward movement of the pitman.

My invention relates, in the third place, to the manner of feeding the timber to the cutters, by means of an upper and horizontal screw, which is also operated by the pitman.

Figure 1:
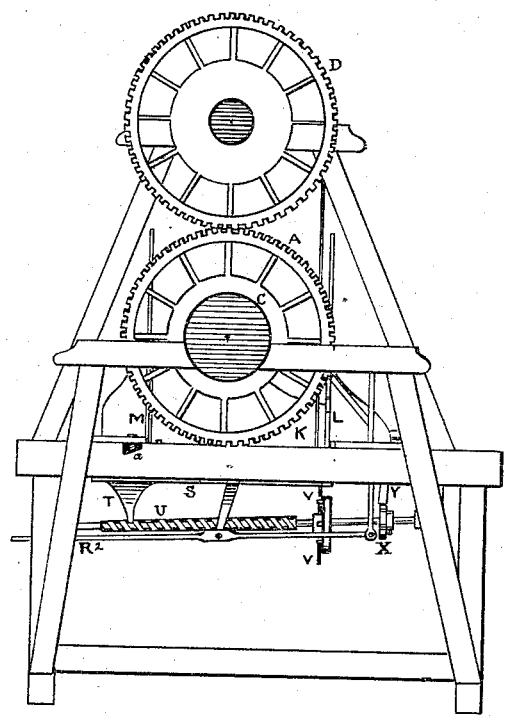
Figures 2, 3:
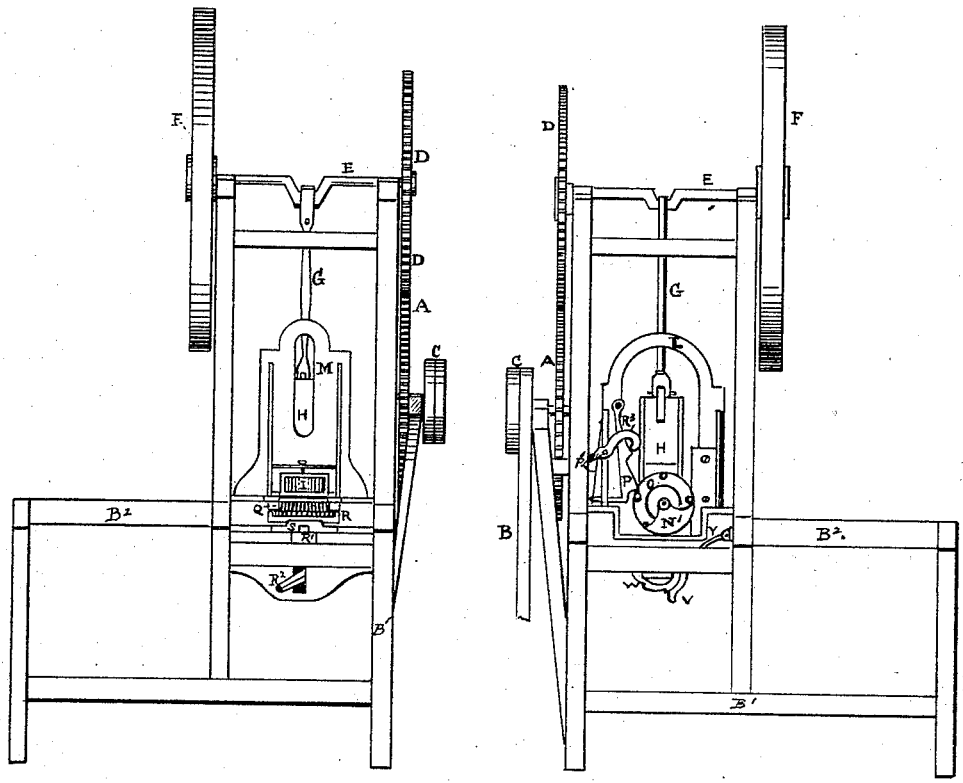
Figure 4:
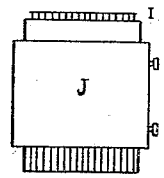
Figure 5:
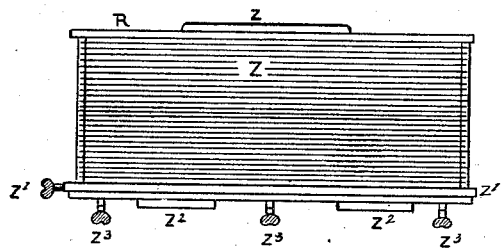
Figure 6:
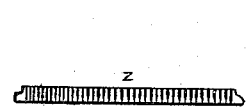
Figure 7:
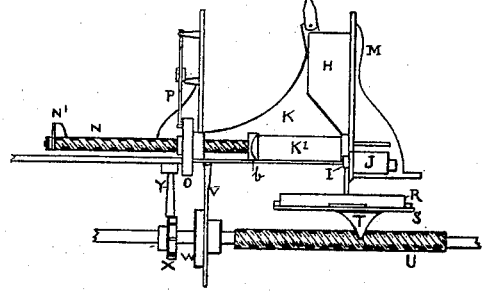

Figure 1 is a front elevation of a machine embodying my invention. Figs. 2 and 3 are end elevations of the same. Fig. 4 is a drawing of the cutters and cutting-box. Fig. 5 is a drawing of the rack-frame. Fig. 6 is a sketch of one of the grooved slides of rack-frame. Fig. 7 shows the plane, cutting-box, and upper and lower screws, with their various attachments.

A is the driving-wheel, operated by a band, B, passing over the pulley C. This driving-wheel meshes into the cogs of the upper wheel D, which communicates motion to the crank-shaft E and balance-wheel F. Attached to the crank-shaft is the pitman G, by the up-and-down movement of which the plane H is made to descend at regular intervals upon the cutters I, contained in the box J. This upright plane is attached to and forms part of the trough K, which contains the lumber, K', for making the matches, and causes the said trough to rise and fall with it between the two pairs of stands L and M. The horizontal feeding-screw N passes through the wheel O, which bites round said screw, and forms a nut, in which it works. This wheel O revolves by means of the feeder-foot P, attached to the standard L, when said feeder-foot engages with certain pins fixed in the periphery of the wheel O as they are successively presented to it by the upward motion of the trough, and the revolution of the wheel causes the screw N to move gradually forward, and so feed the lumber onto the cutters I beneath the plane H, which descends at the same moment, and forces the end of the lumber through the cutters and into the grooves of guide-plate Q, placed immediately below on the standard M, down which they descend to the rack R, which sets in the carriage S. This carriage is propelled forward at a regular speed by the half-nut T, attached to the bottom of it, biting round the horizontal screw U, which revolves by means of the feeder-foot V engaging with pins on wheel W at end of said screw. This feeder-foot is attached to bottom of trough K, and is operated by the upward movement of said trough, and is further furnished with a ratchet-wheel, X, and dog or catch Y, to prevent reaction.

The matches, when cut from the lumber by the plane H and the cutters I, (more particularly shown in Fig. 4,) and after they have passed down the guide-plate Q, are secured in rack R, which rack is moved gradually forward by the action of the lower screw U, as already described, and when the rack is full it knocks against the catch-lock $R^1$, fixed at end of frame, which throws the screw out of action, and releases the feeding-foot P from its action on wheel O, by the screw falling on the end of lever $R^2$, which is connected with the stop-catch $R^3$ at the other end. On the lever $R^2$ depressing this stop-catch it cuts off the action of the feeder-foot from engaging with the wheel O, and stops all further action of the upper screw N. The matches are supported on the rack-frame R in rows in an upright position by the grooved slips Z, about thirty in number, contained in the frame, and regulated by the gage and thumb-nut $Z^1$. The grooved slips are also separated by the teeth at the bottom edge of guide-plate Q. Underneath the rack-frame R is a false or loose bottom, $Z^2$, for the purpose of keeping the matches from running through the frame when it is lifted out. Three screws, $Z^3$, are placed along one of the sides of the frame for the purpose of holding and tightening the matches in position for dipping in the sulphur after the frame is removed from the machine. At the end of the horizontal screw N is fixed a cap, N', which, by fitting over the pins in the wheel O, when the screw N has fed its length, shuts off the feeding-foot P without the machine being thrown out of action. The inside of wheel O is furnished with a ratchet and catch, O', to stop its reaction, and the feeder-foot P is furnished with a spring, P', to maintain it in position. The whole of the machinery is supported on a suitable wooden frame, $B^1$, to which is attached a table, $B^2$, for holding the empty rack-frames. The standard M is supported on both sides by a spiral spring, $a$, (shown in Fig. 1,) the object being to allow of an up-and-down shaking movement, to facilitate the separation of the matches after being cut. Another spring, $b$, on the front end of horizontal screw N, allows the block of timber K' to have a certain freedom in passing over the cutters I.

I claim as my invention—

1. The upright plane H, moving up and down in the standard M by means of the pitman G, in combination with the cutting-box J and cutters I, the grooved guide-plate Q, and spring $a$, substantially as and for the purpose hereinbefore set forth.

2. The upper horizontal screw N and the wheel O, for the purpose of feeding the lumber in the trough K to the cutters I, in combination with the feeder-foot P, the cap N', stop-catch $R^3$, the lever $R^2$, and spring $b$, all constructed substantially as and for the purpose hereinbefore set forth.

3. The rack R, with the grooved slips Z, gage $Z^1$, and set-screws $Z^3$, supported on the false bottom $Z^2$ and carriage S, in combination with the screw U, the nut T, wheel W, ratchet X, catch Y, and feeding-hook V, substantially as and for the purpose hereinbefore set forth.

4. The catch-lock $R^1$ in end of frame, operating upon the screw U, lever $R^2$, and stop-catch $R^3$, substantially as and for the purpose hereinbefore set forth.

October 7, 1875.

PETER WALLACE.

Witnesses:
HENRY BEECH,
PHILIP J. EDMUND.